United States Patent Office 2,768,995
Patented Oct. 30, 1956

2,768,995

PROCESS FOR TREATING ACRYLONITRILE POLYMERS WITH AQUEOUS FORMALDEHYDE

Pierre Mosse, Lyon, France, assignor, by mesne assignments, to Crylor, Paris, France, a corporation of France No Drawing. Application January 19, 1952,
Serial No. 267,316

Claims priority, application France February 19, 1951

4 Claims. (Cl. 260—73)

The present invention relates to a process for modifying the solubility of polymers of the class consisting of polyacrylonitrile and copolymers of acrylonitrile containing in the polymer molecule at least 95% by weight, of acrylonitrile and no free hydroxyl group and characterised by the fact that these polymers are subjected, while in a finely divided state, and before they are converted into the desired physical form, to a treatment of at least 30 minutes in an aqueous solution of formaldehyde.

It is known that the qualities of filaments, threads, films, artificial horse-hairs, moulded products, and all similar articles made of polymers having an acrylonitrile basis can be improved by treating these polymers in solution or after they are formed into shape with aldehydes in the presence of a catalyst.

Nevertheless the application of a similar treatment to finely divided polymers before they are shaped has never been contemplated up till now within the knowledge of the applicant, and, furthermore, it might logically be feared that such a treatment would give rise to difficulties in the further shaping of these polymers.

Now it has been ascertained, which is particularly surprising, that the treatments according to the invention modify the solubility of the treated polymers at ordinary temperature by appreciably diminishing it but without appreciably changing their solubility in the hot. Consequently the readiness with which they can be converted into the desired form at higher temperatures is not adversely affected. The polymers thus modified can be used particularly easily, as it is well known that the mixing of mixtures of polymers having a basis of acrylonitrile and of solvents should be begun under conditions where the phenomenon of solution plays as small a part as possible, so that the solution of the product only takes place subsequently by heating of the mass. The polymers modified according to the invention are therefore well adapted to these processes because the initial mixing thereof is rendered less sensitive to variations of the surrounding temperature and to local heating brought about by the energy used for stirring and mixing and by friction.

The extent of the modification undergone by the polymer depends essentially on the duration of the treatment and the temperature at which this has been effected, the modification being the greater the more elevated is the temperature and the more prolonged is the treatment. These two factors can vary to a very great extent, for example, the temperature can be between 10° and 150° C. and the duration of the treatment can be between ½ hour and 24 hours though the data given above are by no means absolute limits.

The concentration of the aqueous solution of formaldehyde can vary also within wide limits, for example, between 0.1% and 30%. Excellent results are obtained for example, with concentrations of 0.4 to 4.0%.

The treatment according to the invention can be carried out in an open vessel or in a closed vessel under pressure, either of air or of an inert gas. It can be carried out either as a discontinuous or a continuous process.

When the reaction is finished, the polymer is separated by one of the known processes. It is then washed in the cold or in the hot with any desired liquid, for example, water, an aliphatic alcohol, a ketone, etc. The washing can naturally be carried out successively with two or several liquids.

The following non-limitative examples are intended to illustrate various methods of carrying out the invention. The parts and percentages relate to parts by weight.

*Example 1*

A polyacrylonitrile having a specific viscosity of 0.385, this being measured at 20° C. in a 0.2% solution in dimethyl formamide further characterised in that 20 parts when mixed at 20° C. in 80 parts of dimethyl formamide give an elastic jelly, is used. 10 parts of this polyacrylonitrile are introduced into an autoclave containing 120 parts of a 20% aqueous solution of formaldehyde at 20° C. The temperature is gradually increased to 120° C. and this temperature is maintained for 3 hours. The product is then filtered in the hot, the polymer washed with soft water at 70° C. and dried at 90° C.; it is no longer soluble in dimethyl formamide at 20° C. A dispersion of this polymer in the said solvent when heated slowly becomes suddenly viscous at about 60° C. in consequence of the polymer dissolving.

*Example 2*

1 part of a polyacrylonitrile, which gives at ordinary temperature in dimethyl formamide a very viscous 24% composition, is added while agitating to 8 parts of water at 60° C. containing 0.4% parts of formaldehyde. This temperature is maintained for 12 hours with agitation and the polymer is then filtered off mechanically and washed with water at 50° C. until the excess of formaldehyde has disappeared. A last washing is made with 3 parts of acetone, and the polymer is dried under reduced pressure at 30° C. A polyacrylonitrile is obtained which is perfectly white and which gives a 24% composition with dimethyl formamide which is a hardly viscous suspension at ordinary temperature and even at 40° C., but which shows the characteristics of an excellent solution at 80° C.

*Example 3*

22 parts of the copolymer obtained by polymerisation of a mixture of 95% of acrylonitrile and 5% of vinyl dimethylaminoethyl oxide is treated with 110 parts of a 30% aqueous solution of formaldehyde for 1 hour at 120° C.

The copolymer thus treated is filtered and is washed on the filter with soft water until there is no more formaldehyde in the wash liquors and then a final washing is made with acetone and the product dried for 15 hours, at 60° C.

The whole of the copolymer treated in this way is then dispersed in a mixture of 73 parts of dimethyl formamide and 5 parts of cyclohexanone. This dispersion made by agitation is very slightly viscous at ordinary temperature. This dispersion is heated to 80° C. and at this temperature it is transformed into a perfectly clear and homogeneous solution.

The same copolymer, not treated with formaldehyde as described above, dissolves at ordinary temperature in this mixture of dimethyl formamide and cyclohexanone and gives a very viscous solution.

The invention is not limited to the methods of carrying it out particularly described in the previous examples; it includes on the contrary the variations which are obvious to those versed in the art.

Thus, for example, the liquid for treating the polymers instead of being neutral, can be alkaline, or acid, and particularly having a pH between 6 and 7. Acidification can be made by any mineral or organic acid or by acidic substances or substances capable of splitting in the heat so as to give rise to acid.

One can likewise advantageously add a softening agent to the reaction liquid. One can also if desired introduce a bleaching agent into the liquid used for the treatment of the polymer. Sodium chlorite is particularly advantageous.

Likewise the drying of the polymer is not necessarily carried out as indicated above. It can be done at any desired temperature preferably below 130° C. The drying can be carried out in the air or in an inert gas, or under reduced pressure, or yet again instead of drying the treated polymer, one can displace the washing liquid by another liquid which may be left in contact with the polymer until the time when it is mixed with the solvent intended to dissolve it, or any other solvent.

What I claim and desire to secure by Letters Patent is:

1. A process for diminishing the solubility in dimethylformamide of polymers selected from the group consisting of polyacrylonitrile and the copolymer containing in the polymer molecule 95% by weight of acrylonitrile and 5% of vinyl dimethylaminoethyl oxide characterized by subjecting the said polymers in a finely divided state and before shaping them into the desired physical state to a treatment of at least 30 minutes with an aqueous solution of formaldehyde at pH between 6 and 7.

2. A process according to claim 1, in which the treatment with aqueous formaldehyde solution is carried out under pressure at a temperature between 10° C. and 150° C.

3. A process according to claim 1, in which the aqueous formaldehyde solution has a concentration between 0.1% and 30%.

4. A process according to claim 1, in which the aqueous formaldehyde solution has a concentration between 0.4% and 4%.

References Cited in the file of this patent

UNITED STATES PATENTS

| | | |
|---|---|---|
| 1,939,422 | Voss et al. | Dec. 12, 1933 |
| 2,332,899 | D'Alelio | Oct. 26, 1943 |
| 2,624,722 | Kropa et al. | Jan. 6, 1953 |

FOREIGN PATENTS

| | | |
|---|---|---|
| 716,322 | Germany | Jan. 20, 1942 |